B. F. COLE.
ROD COUPLING.
APPLICATION FILED JULY 10, 1907.
922,263.
Patented May 18, 1909.
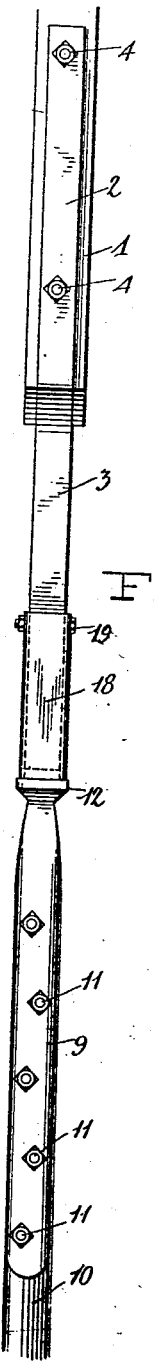
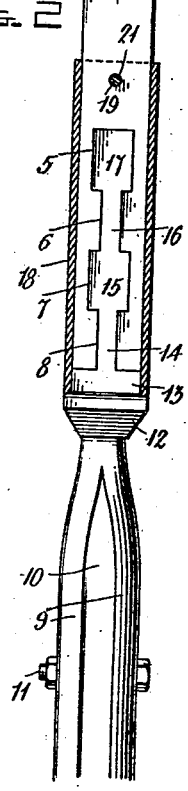
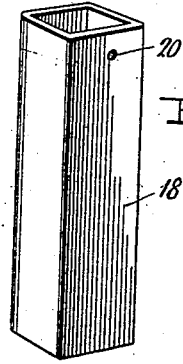
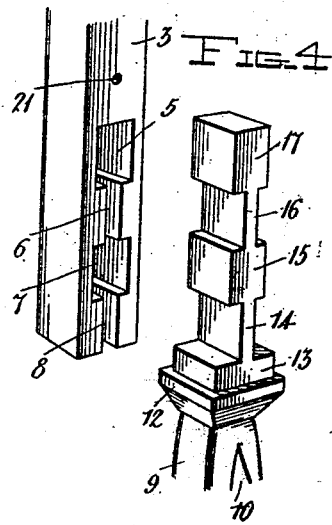
Inventor
Benjamin F. Cole
By Victor J. Evans
Attorney

UNITED STATES PATENT OFFICE.

BENGAMIN F. COLE, OF MENARDVILLE, TEXAS.

ROD-COUPLING.

No. 922,263.　　　　Specification of Letters Patent.　　　　Patented May 18, 1909.

Application filed July 10, 1907. Serial No. 383,159.

*To all whom it may concern:*

Be it known that I, BENGAMIN F. COLE, a citizen of the United States of America, residing at Menardville, in the county of Menard and State of Texas, have invented new and useful Improvements in Rod-Couplings, of which the following is a specification.

This invention relates to shaft couplings designed more particularly for use in connecting the sucker rod of a windmill pump, and one of the principal objects of the invention is to provide means for coupling the two sections of the sucker rod and to permit the same to be readily uncoupled and to be quickly coupled whenever required.

Another object of the invention is to provide a male and female coupling member formed upon the meeting ends of the sections to be coupled, and a sliding sleeve to cover the coupling members and to prevent them from displacement, said sleeve being adapted to be quickly slid upon one of the members to permit the sections to be readily uncoupled and to provide means whereby they may be quickly recoupled whenever required.

These and other objects may be attained by means of the construction illustrated in the accompanying drawing, in which:

Figure 1 is an edge view of the coupling. Fig. 2 is a side view in which the sliding sleeve is shown in section. Fig. 3 is a detail perspective view of the sliding sleeve. Fig. 4 is a detail perspective view of the male and female members of the coupling.

Referring to the drawing for a more particular description of my invention, the numeral 1 designates the lower end of the pitman of a windmill, and 2 is a stirrup formed upon the upper end of the shank 3, said stirrup being connected by bolts 4 to the pitman 1. The shank 3 is rectangular in cross section, and formed in the lower end of said shank is a rectangular aperture 5 provided with a reduced slot 6 at the lower end thereof which communicates with a rectangular aperture 7, and extending from the aperture 7 is a narrow slot 8 which extends entirely through the end of the shank 3. For convenience this section may be called the female member.

The male member consists of a bifurcated portion 9 between which is bolted the lower section 10 of the sucker rod or pitman, these parts being connected by suitable bolts 11. Formed upon the upper end of the bifurcated portion 9 is a rectangular shoulder 12 and formed integral with this portion is an oppositely projecting flange 13 extending from which is a narrow neck 14. Above the neck 14 is a pair of oppositely disposed lugs 15 and above the lugs 15 is a narrow shank 16 upon which an enlarged head 17 is formed. This portion of my device ma be termed the male member, and is adapte to fit within the recesses 5 and 7 and the connected slots 6 and 8, said two membe then lying flush upon their outer surfac A sliding sleeve 18 fits over the male a female members to hold them in connecti and a locking pin 19 extends through opening 20 in the sleeve and through a he 21 in the shank 3.

The operation of my invention may briefly referred to as follows: Whenever it is required to uncouple the pin 19 is withdrawn, the sleeve 18 is slipped upward, and the male member is withdrawn from the female member in an obvious manner. Whenever it is required to recouple, after the male member has been placed in position, the sleeve 18 is slipped down and the pin 19 passed through the parts to hold the sam in coupled relation.

From the foregoing it will be obvious tha my coupling is of simple construction, can be operated quickly to connect or disconnect the two members, and that a single key c bolt is used for holding the parts in opert tive position.

Having thus described the invention, what I claim is:

A shaft coupling comprising a shank with a series of rectangular recesses extending centrally through the same and having a plurality of narrow slots communicating therewith and also extending centrally through the shank, said shank having a passage formed therethrough adjacent to one of said recesses, a bifurcated member having a shoulder on its upper end and a fla ge contiguous therewith, a plurality of narr w necks extending above said flange, a pl rality of rectangular heads disposed inte mediate of said necks, said necks and said ls respectively being adapted to fit in recess and slots respectively formed in said shank, a sleeve carried by the shank adapted to be slidably mounted over the joint of said member and said shank and having the lower portion of its surrounding wall and its bottom edge contacting respectively with said flange and said shoulder and a pin inserted through the sleeve and shank, substantially as specified.

In testimony whereof, I affix my signature in presence of two witnesses.

BENGAMIN F. COLE.

Witnesses:
L. W. AINSWORTH,
D. W. MADDOX.